United States Patent [19]
Gokey

[11] Patent Number: 5,386,762
[45] Date of Patent: Feb. 7, 1995

[54] ROBOTIC CHEF

[76] Inventor: Phillip E. Gokey, 1145 N. Parker Dr., Janesville, Wis. 53545

[21] Appl. No.: 218,248

[22] Filed: Mar. 28, 1994

Related U.S. Application Data

[63] Continuation-in-part of Ser. No. 944,298, Sep. 14, 1992, abandoned.

[51] Int. Cl.6 .......................... A47J 37/00; A47J 37/06
[52] U.S. Cl. ........................................ 99/326; 99/355; 99/357; 99/423; 99/443 C; 414/225; 901/7
[58] Field of Search ...................... 99/326–328, 99/331–335, 352, 355, 357, 386, 387, 422, 423, 443 R, 443 C; 414/225; 901/6, 7; 221/289, 290, 293

[56] References Cited

U.S. PATENT DOCUMENTS

| | | | |
|---|---|---|---|
| 1,848,104 | 3/1932 | Brand | 99/334 |
| 2,556,808 | 6/1951 | Harris | 99/443 R |
| 2,646,495 | 7/1995 | Dornbush | 99/391 |
| 3,340,793 | 9/1967 | Nilsen | 99/423 |
| 3,450,027 | 6/1969 | Lohr et al. | 99/423 |
| 4,345,514 | 8/1982 | Morley | 99/423 |
| 4,503,502 | 3/1985 | Chapin | 99/335 |
| 5,018,438 | 5/1991 | Grandi | 99/357 |

Primary Examiner—Timothy F. Simone
Assistant Examiner—Mark Spisich
Attorney, Agent, or Firm—William Flynn

[57] ABSTRACT

An automated food preparation system having a continuously rotatable annular segmented cooking area, a food feeding system, and an industrial robot, all of which are controlled by a pre-programmed programmable controller wherein an operator provides input to the programmable controller selecting each food item to be cooked and the programmable controller commands the industrial robot to select the food item, place the food item on the cooking area for cooking, turn the food item at the proper time, and remove the food item from the cooking area.

13 Claims, 10 Drawing Sheets

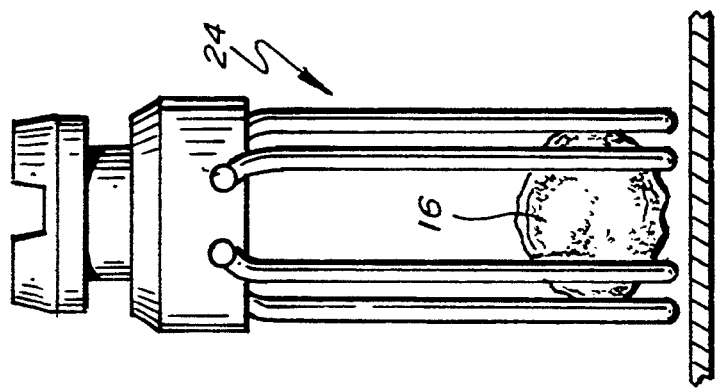
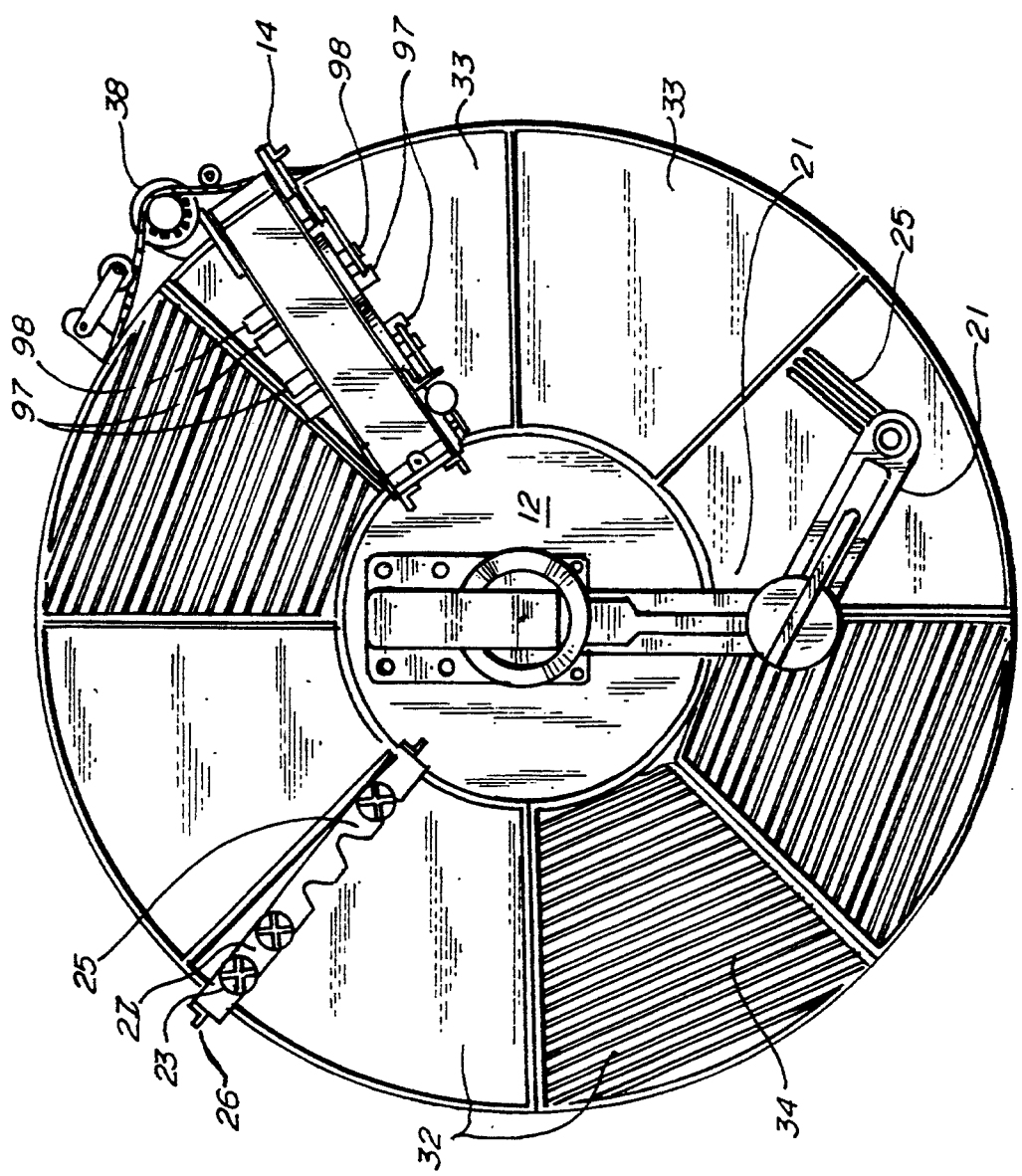

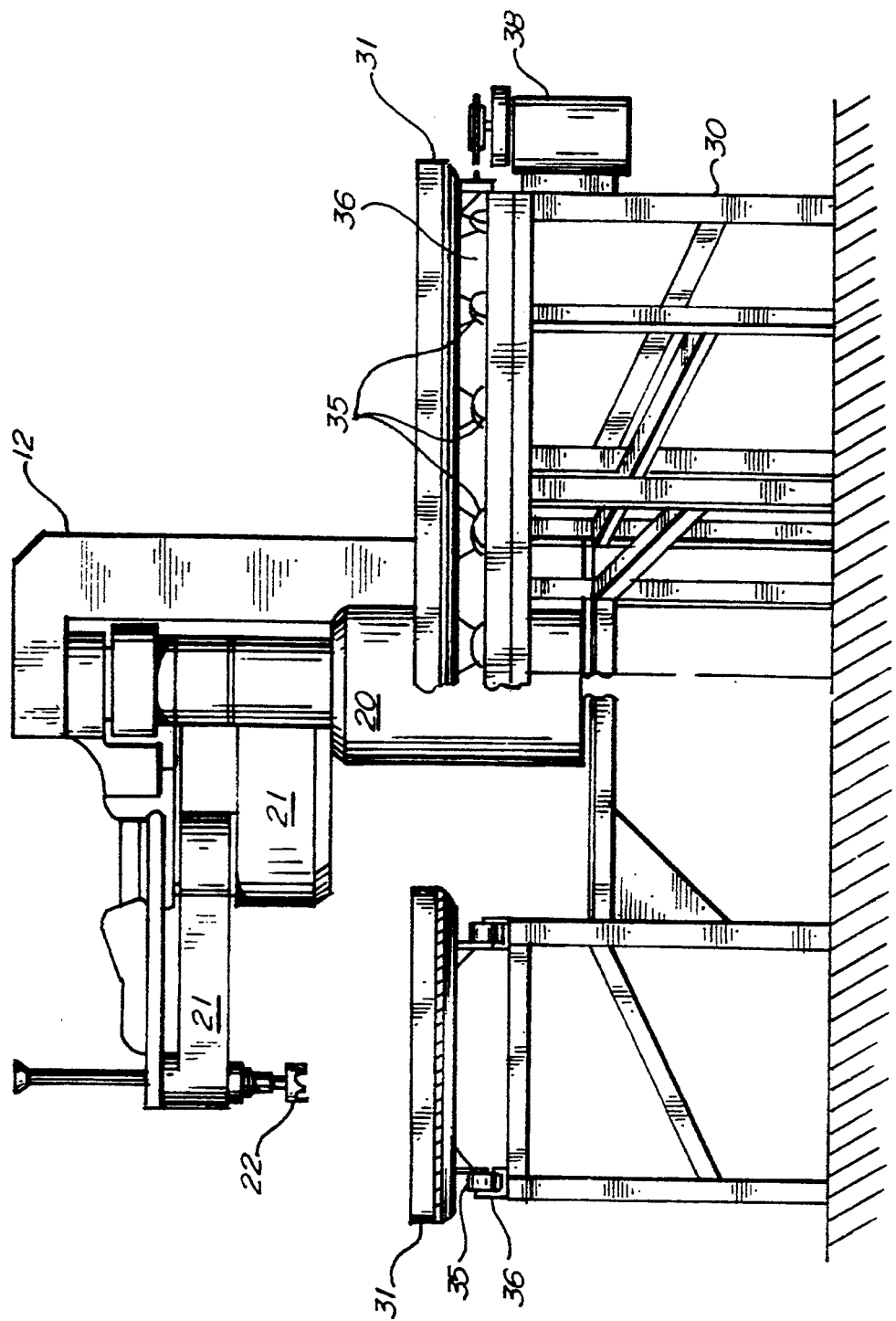

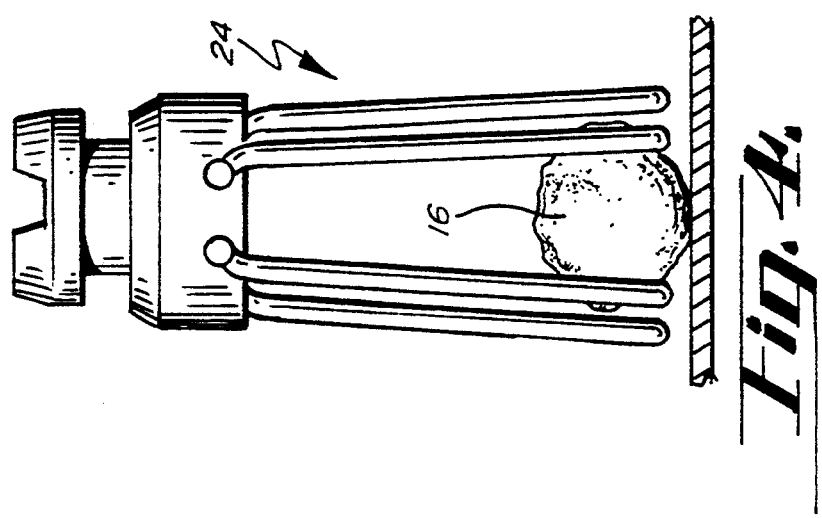
Fig. 4.
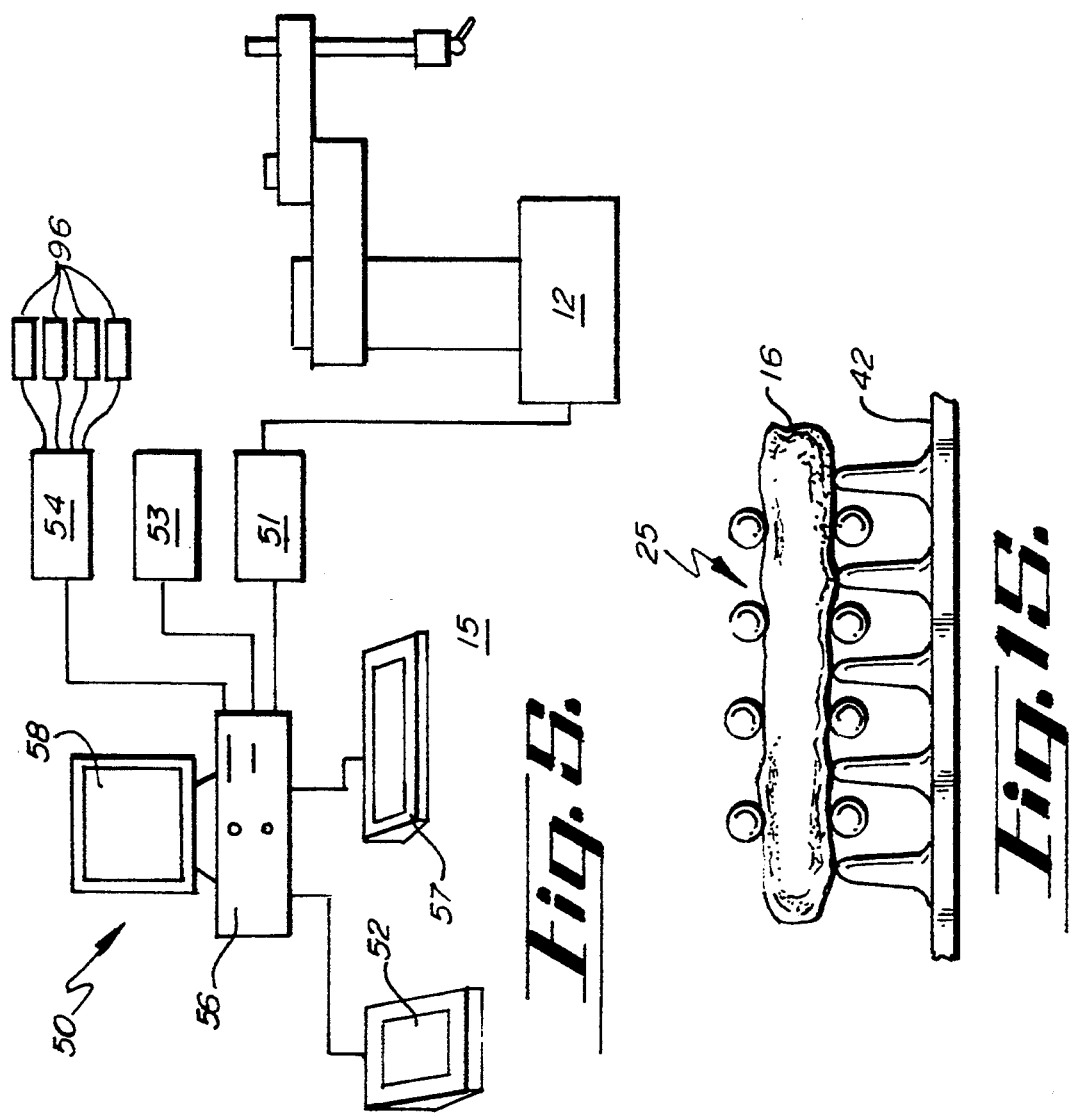
Fig. 5.
Fig. 15.

ROBOTIC CHEF

This application is a continuation in part of Ser. No. 7/944,298, filed Sep. 14, 1992, now abandoned.

BACKGROUND OF THE INVENTION

The invention relates to a method and apparatus for semi-automatically handling and cooking a multiplicity of individual food items and more particularly, a system and apparatus that dispenses each food item onto a cooking surface for cooking the food item a controlled, selectable time and removal of the cooked food item. The system provides an industrial process technique applied to the handling and processing of food items on a commercial mode. The system provides selectable variation in the type of grill surface, variation in cooking time of each individual item, and variation in handling means to suit each type of food item. The system is computer controlled under limited direction of an operator and under limited direction of a consumer.

Preparation of multiple similar food items is a labor intensive process involving the preparation of the individual food items, the cooking of each food item and the presentation and serving of each food item to the consumer. With the currently rising labor costs it has become advantageous to automate the process. The present invention focuses on the automation of the cooking process whereby operator intervention in the cooking process is eliminated. The prior art shows several attempts to automate the preparation process.

U.S. Pat. No. 3,450,027 issued Jun. 17, 1969 to A. Lohr, et. al. discloses a device having an elliptical annular heated cooking grill with a plurality of pusher bars for moving the food items along the surface of the grill. A turning station approximately half way through the cooking path inverts the food items allowing cooking on the second side thereof. While the Lohr apparatus does reduce the labor required to cook numerous identical food items, the cooking time cannot be altered for an individual food item or group of food items. The degree of "doneness" can be altered only by controlling the heat of the grill and the speed of the pusher bars. Thus, where a large number of food items are to be prepared identically, the apparatus will perform fairly well. However, where a mixture of food items or identical food items are to be cooked differently, the apparatus will require sufficient operator intervention to obviate its benefits. It is also noted that an operator must place each food item on the Lohr grill and remove the cooked food items from a collection receptacle.

U.S. Pat. No. 4,345,514 issued Aug. 24, 1982 to Fred Morley discloses heated rotating grill for pressing and cooking hamburger patties. The Morley invention is drawn toward the inclined plane apparatus for pressing balls or clumps of hamburger into patties responsive to the rotation of the grill. Again, Morley does not provide for alteration of the cooking of an individual food item, and the operator must intervene to place the hamburger onto the grill, turn the patties, and remove the patties.

U.S. Pat. No. 2,646,495 issued Jul. 21, 1953 to E. Dornbush discloses an angled rotating grill for cooking a multiplicity of individual food items. The Dornbush grill, again, does not allow for the alteration of cooking of an individual food item within a group of food items. Further, an operator must place the individual food items on the grill, turn the food items, and collect the food items from the receiving pan.

The prior art is deficient in two areas, first, each of the prior art devices requires some operator intervention. Second, none of the prior art devices can alter the cooking of an individual food item or group of food items responsive to the consumer's request.

SUMMARY OF THE INVENTION

The invention comprises an annular rotating cooking surface, an industrial robot for manipulating the food items onto the grill for cooking and removing the food items, a food item feeding system, and a controller for coordinating the individual tasks and controlling the execution of each of the aforementioned elements.

The production of individual food items for the food service industry; has recently greatly increased. Many applications involve the preparation of a large number of similar food items for service and consumption in a short time. Some applications are simply high volume all the time. Other applications involve the preparation of a large number of food items for service over a short time, such as a banquet meal or a meal time rush. These periods of relatively high activity are usually interspersed between periods of relative inactivity.

A further complication arises when different types of food items are to be prepared in large numbers. For example, when grilled hamburgers and grilled chicken are both prepared in large numbers, the cooking time for the different items varies and the cooks must keep track of the cooking times for each side of each food item so that the food items are properly cooked for service.

Previously, this type of food production has been very labor intensive, often necessitating hiring additional personnel and acquiring additional equipment to be installed in an already crowded kitchen area. The additional personnel and equipment are unable to work as efficiently due to the space limitations in the food preparation area. Cooking a large number of food items by an operator over a pan grill or flame grill is a hot, sometimes hazardous, task in which considerable strain and fatigue is experienced. Work in such a crowded and stressful environment often leads to increased errors cooking foods. The cooking errors then must be re-cooked which further overloads the food preparation area. The cooking errors that are not discovered, but instead served, will lead to reduced customer satisfaction that, to say the least, is neither desirable nor profitable.

The addition of personnel and equipment is particularly inefficient when it is acquired to service the very transient rush business. The added personnel and equipment are especially taxing to the resources of a small company.

The invention described herein resolves many of these problems by automating the cooking process so that one operator may initiate the cooking process from a keypad or point of sale terminal and an operator can then remove the cooked food items from a presentation area.

The invention herein is a commonly available industrial robot adapted for the handling of food on a circular rotating cooking area combined with an automated food feeding system providing a multiplicity of the individual food items individually accessible to the robot. The entire system is timed and controlled by a computer system and appropriate programming in software.

A large number of the food items to be cooked are loaded into the food feeder system. The food feeding system is controlled by the digital controller and presents the individual food items to the robot for placement on the cooking area. The food feeding system consists of a number of bifurcated food trays each tray adapted for carrying and storage of a group of a particular food item. The food trays are previously loaded with food items and a number of the food trays are placed into the food feeding system. The food feeding system presents an individual tray containing a plurality of individual food items accessible to the robot.

The robot, using an appropriate end effector, takes an individual food item and places it on the heated cooking area. Usually, the food item will be cooked to a standard degree of doneness and the cooking time is controlled by rotational speed of the cooking area. However, when the food is to be cooked to a lesser degree of doneness, the robot, using the proper end effector, moves the food item forward on the cooking area decreasing the overall cooking time. Inversely, when the food item is to be cooked to a greater degree of doneness, the robot, using the proper end effector, moves the food item back on the cooking area increasing the overall cooking time. Food items must be turned during the cooking process so that the food item is cooked throughout. With some food items, such as steaks, a single turning is preferred, however, with food items such as pan broiled hamburgers, three and sometimes four turnings are necessary.

When cooking is completed, the robot may remove the food item from the cooking area to an area where an operator completes the preparation and serving of the food item. In some instances, an operator will remove the food items from the cooking area It is a principle object of the present invention to automate the cooking of a multiplicity of different food items.

It is an object of the present invention to automatically cook a multiplicity of food items, cooking each food item to a selected degree of doneness.

It is an object of the present invention to reduce the amount of human labor necessary to cook a large number of food items.

It is an object of the present invention to reduce the number of mistakes occurring when repetitively cooking a large number of food items.

It is an object of the present invention to automate the cooking of a multiplicity of like food items.

It is an object of the present invention to provide a viewable robot performing the task of cooking food items.

BRIEF DESCRIPTION OF THE DRAWINGS

The foregoing and other objects of the invention will become apparent upon a reading of the following specification, with reference to the appended claims and drawings, in which:

FIG. 1A is an plan view of the invention.

FIG. 2 is a partial cutaway side view of the invention.

FIG. 3 shows a grasping type end effector gripping a food item.

FIG. 4 shows a grasping type end effector releasing a food item.

FIG. 5 is a block logic diagram of the invention for use in a non-display application.

FIG. 15 shows an end view of the robot arm end effector manipulating a food item from a food carrier of FIG. 12 or FIG. 14.

DESCRIPTION OF THE PREFERRED EMBODIMENT

Figure 1:
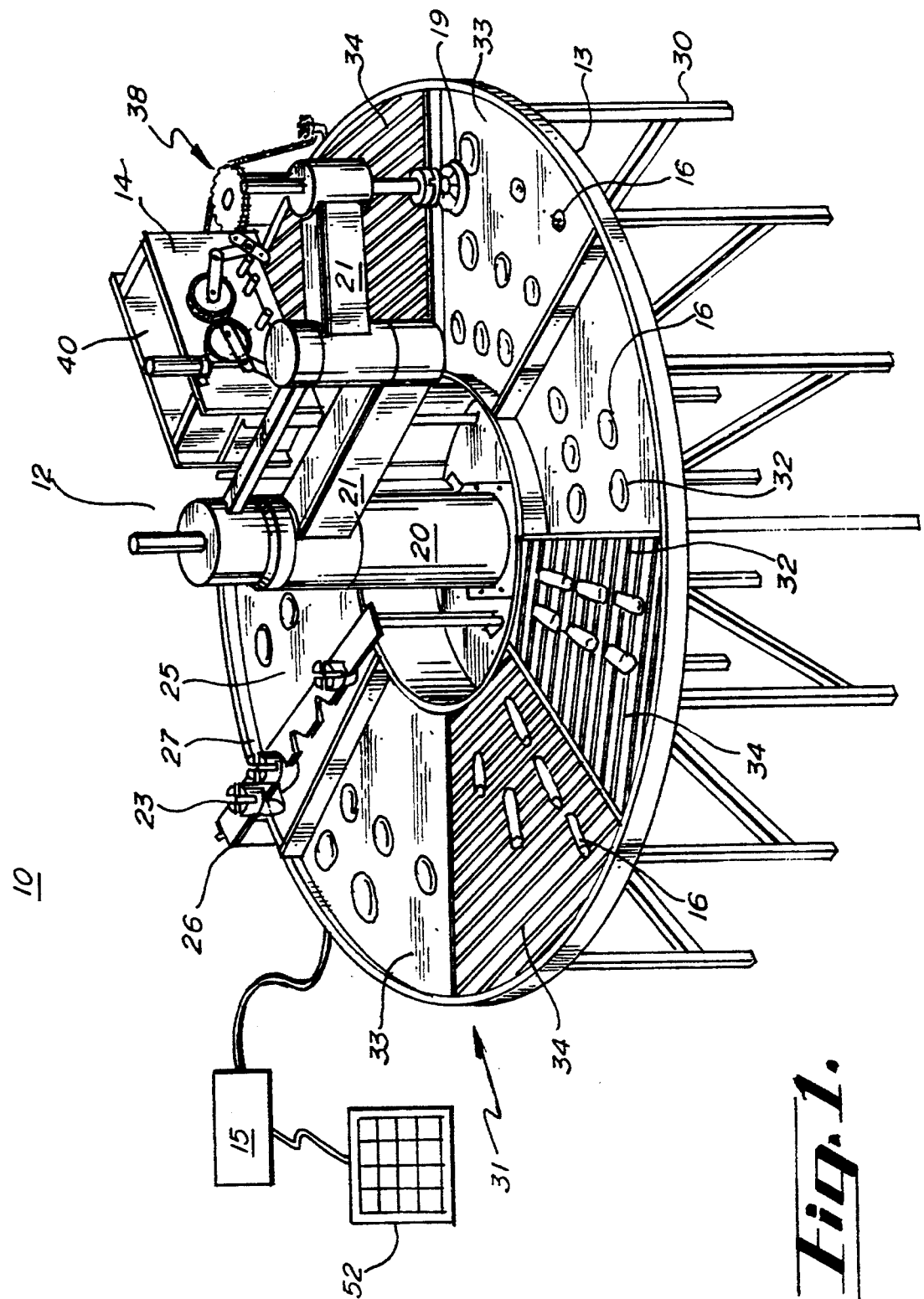
FIG. 1 is an overall elevational view showing the invention in operation.

Referring first to the drawings, in particular, FIG. 1 shows an overall view of the invention 10. The invention 10 consists of robot 12, the rotating cooker 13, the food feeder assembly 14, and the programmable controller 15, also shown diagramatically in FIG. 5.

The robot 12 consists, generally, of the robot body 20 with an attached movable arm 21. Affixed to the terminal end of the movable arm is a removable end effector, generally, 19. The end effector 22 shown in FIG. 2 is adapted to flatten round quantities of a food item 16 for grilling on the rotating cooker 13.

The rotating cooker 13 is annular in shape having a central open area for placement of the robot 12. The cooker 13 is located on a base 30 of a suitable height for convenient intervention by a human operator. The rotatable cooking area 31 is composed of a plurality of removable arcuate sections 32. The cooking area 31 is rotated using conventional rotating means 38 and heated to a selected temperature using conventional heating means.

The food feeder system 14 consists of a rectangular magazine 40 suitable for accepting a plurality of prefilled food carriers 41 as shown in FIGS. 6–11. The food carriers 41 are presented individually to the robot 12. The robot 12 can remove each food item 16 for cooking. The presentation of the individual food carriers 41 is controlled and sequenced by the programmable controller 15.

The programmable controller 15 may be any suitable programmable digital controller capable of sensing external events and controlling other external events. The programmable controller 15 is assembled from readily available components. The programmable controller 15, as illustrated diagrammatically in FIG. 5, consists of a personal computer 50, interfaced with a robot controller 51, an input keypad 52, a position sensor 53 for input from the cooker 13, and food feeder interface 54. This configuration of the programmable controller 15 utilizes readily available off the shelf parts combined with a custom overlay for the input keypad 52 and custom software for the personal computer 50 integrated into an operating system for controlling the invention 10.

The robot 12, as shown in FIG. 1, is illustrated as a "scara" type robot having a single movable arm 21 which is rotatable about the center of the robot 12. It is understood that the "scara" type robot 12 is illustrated for convenience and that other types of industrial robots 12 can be utilized, The robot arm 21 is further positionable along any radii of its rotation such that an end effector 22 can reach all points on the rotating cooking area 31 within a settable arc, less than 360 degrees. In the remaining space within the arc the robot 12 is mechanically prevented from accessing. This area is a "safe" area where an operator can safely work.

The robot 12 may use one of several end effectors 19 available to the robot 12 or the robot 12 may use combination end effectors 19 having multiple uses. The end effectors 19 used will include a flattening or spatula type end effector 22 as shown in FIG. 1 and include rod type grasping end effector 24 as shown in FIGS. 3 and 4. An additional form of parallel rod grasping type end effectors 25 is shown in FIG. 15.

While only one end effector 19 can be affixed for utilization at any one time, the robot 12 is capable changing its end effectors 19 without operator intervention as the need arises. The robot 12 stores the multiple end effectors 19 in a storage rack 26 of conventional design located so that the robot 12 can remember where each end effector 19 is stored and retrieve the proper end effector 19 when desired. Storage racks 26 of this type are well known in the art and readily available from numerous commercial sources. Thus the robot 12 can select a rod type grasping end effector 24 to use for grasping and picking up a ball of ground meat food item 16 for placement on a flat grill segment 33 of the cooking area 31 as shown in FIG. 3. The robot 12 then opens the rods of the rod type grasping end effector 24 to release the food item 16 onto the flat grill 33 as shown in FIG. 4. The robot then changes the rod type grasping end effector 24 to a flattening type end effector 22, as shown in FIG. 1, and presses the food item 16 flat for cooking. Following the same food item 16 through the cooking process, at a prescribed point in the cooking process, the robot 12 selects a spatula type end effector 23 and turns the food item 16 over to cook the reverse side of the food item 16. When cooking is completed, the robot 12 again returns with a spatula type end effector 27 and removes the food item 16 from the cooking area 31 placing the food item 16 in an operator accessible area such as a holding pan or tray (not shown).

The cooker 13 consists of a rotating annular cooking area 31 having an open center occupied by the robot 12. The cooking area 31 is divided into multiple, typically eight, arcuate segments 32. The cooking area 31 can be rotated on a plurality of wheels 35 rolling in a "U" shaped track 36. The rotation means 38 can be any conventional power source capable of rotating the cooking area 31 in the range of 10 minutes to 40 minutes per revolution. In an alternate embodiment of the invention, the rotation means 38 rotates the cooking area 31 incrementally by waiting a period of time and then rotating the cooking area 31 through a preselected fixed arc of less than 45 degrees. The method of rotation may be selected for a specific application. Typically, each incremental rotation will advance one arcuate segment 32 or a fraction thereof. The rotation means 38 is typically an electric motor powered controlled by programmable controller 15. When an electric motor is used for the rotation means 38, the electric motor may either be either a motor that rotates continuously and slowly or a motor that rotates at a much faster rate, but discontinuously. The latter are usually referred to as indexing drive units. The rotation of the cooking area 31 is selected so that each food item 16 is completely cooked in less than one revolution of the cooking area 31. When so selected, the rotation time is typically varied from five to forty-five minutes per revolution. When the motor of the rotation means 38 operates discontinuously, each increment advancing cooking area 31 is in the range of from 3 to 45 degrees.

Each of the arcuate segments 32 contains a removable cooking area which may be either a planar grill 33 or a wire grid 34. The type of cooking area segment is selected to provide proper cooking of the particular type of food item 16 being cooked. For example, sausages are traditionally cooked on a wire grid 34, hamburgers and steak may be cooked on either a flat grill 33 or a wire grid 34 and eggs can only be cooked on a flat grill 33.

The cooking area 31 is heated using conventional means such as gas or electricity. The temperature of the cooking area 31 may be controlled either manually, or by the programmable controller 15. The heating means 37 may be continuous beneath the cooking area 31 or composed of a number of individually controllable segments, the number of segments preferably corresponding to the number of arcuate sections 32 of the cooking area 31. The heating means 37 has been illustrated for convenience as a gas burner, it is understood that electric elements or any other conventional heating method can be selected.

The food feeder system 14 has a food feeder magazine 40 and a plurality of food carriers 41. The food carriers 41 are bifurcated into a feeder tray 42 and a supply tray 43. Each pair of feeder tray 42 and supply tray 43 are matched and adapted for handling a particular type of food item 16.

Figure 12:
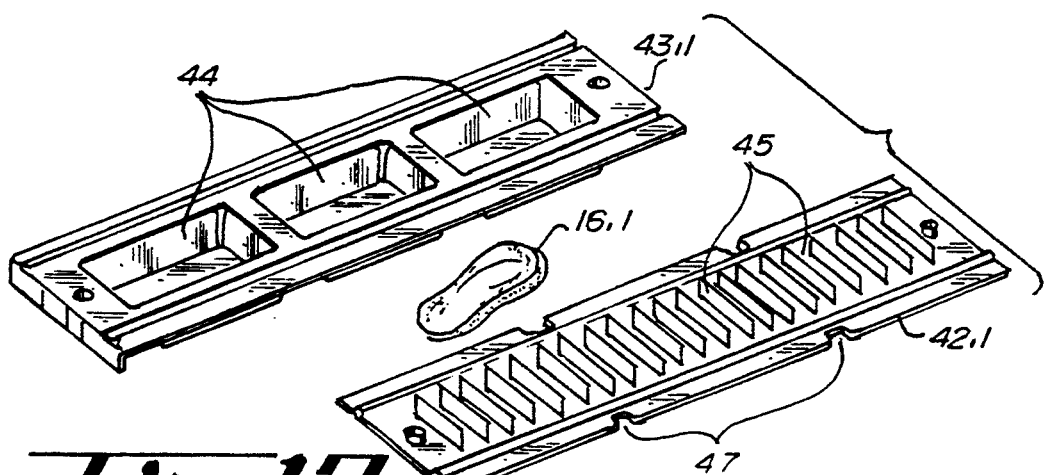
FIG. 12 through FIG. 14 show examples of the some of the various food carriers that have been adapted for transferring food items through the food feeding dispenser.
Figure 13:
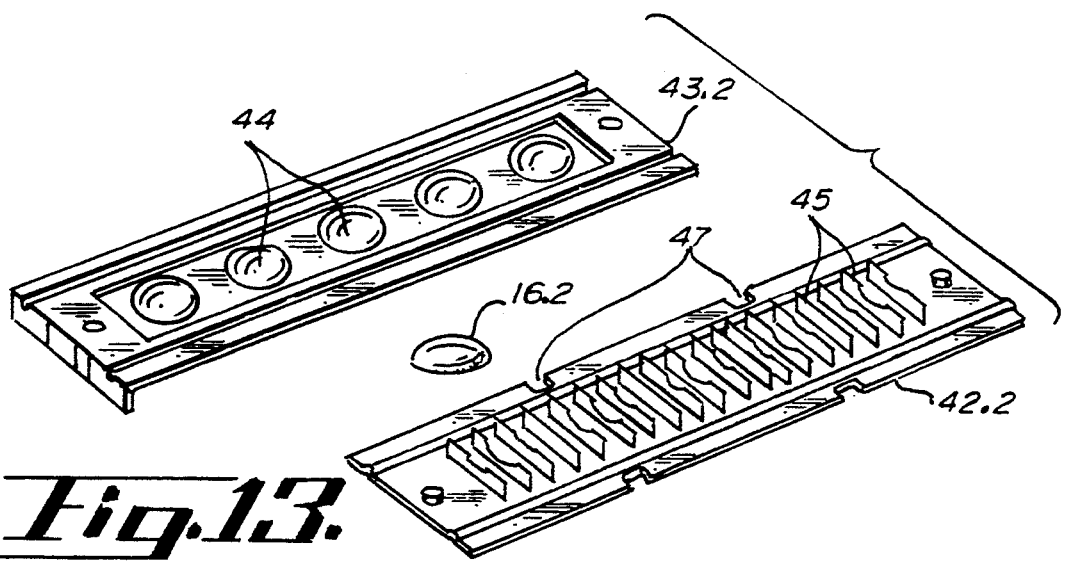
Figure 14:
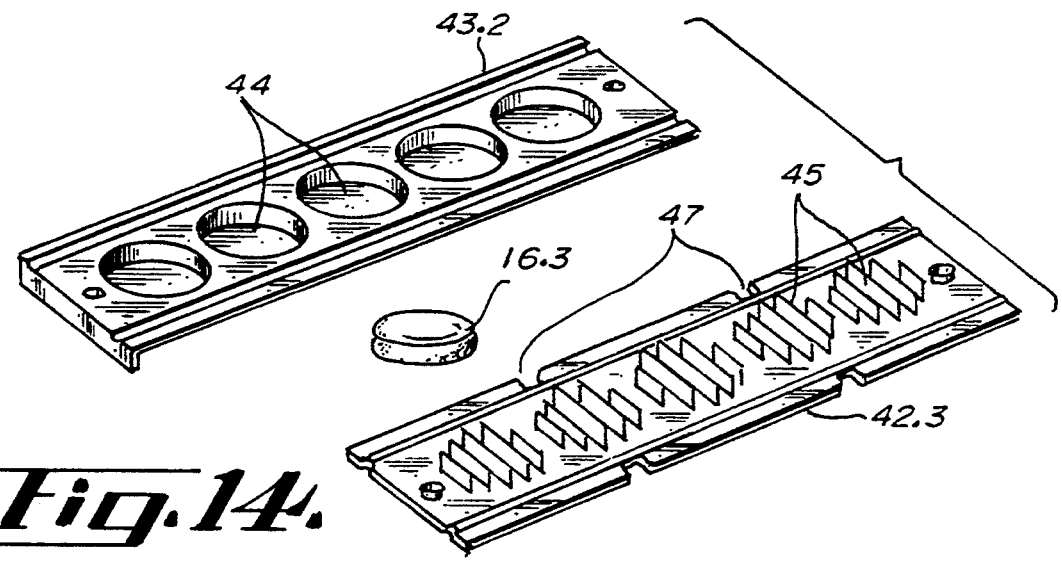

The supply trays 43 are rectangular in shape and have a plurality of receptacles 44 formed therein. The receptacles 44 are sized and shaped to accept a particular food item. FIG. 12 shows a supply tray 43.1 having three receptacles each sized and shaped to receive one steak or chop type food item 16.1. FIG. 13 shows a supply tray 43.2 having five receptacles each sized and shaped to receive one ball of ground meat type food item 16.2. FIG. 14 shows a supply tray 43.3 having five receptacles each sized and shaped to receive one patty of ground meat type food item 16.3.

The feeder trays 42 are rectangular in shape having the same dimensions as the respective supply trays 43. A pair of index notches 47 is formed in a spaced apart relation along each length of each feeder tray. Each feeder tray 42 also has a multiplicity of transfer holders 45 extending upwardly from its surface. The transfer holders 45 are arranged on each feeder tray 42 so as a set of transfer holders 45 will fit into a mating receptacle 44 of a supply tray 43. The transfer holders 45 of feeder tray 42.2 are further adapted having a curved terminal end 46 to retain a round food item 16, such as a ball of ground meat. The transfer holders 45 of feeder tray 42.3 are further adapted having varying lengths to approximate a circle and fit within the round receptacles 44 of supply tray 42.3. The spacing of the transfer holders 45 is such that the robot 12 using the parallel rod end effectors 25 can place the rods of the end effector 25 between the respective transfer holders 45 to lift and grasp the food item 16 with the parallel rod end effector 25.

The food carriers 41 are prepared for use by prefilling with food items 16. Each supply tray 43 receives an appropriate number and type of food items 16 and the matching feeder tray 42 is then placed atop the supply tray 43 covering the food items 16. The filled food carrier 41 is then stored for future use.

Feeder magazine 40 of the food feeding system 14 has a rectangular central opening sized to receive a plurality of food carriers 41, as shown in phantom in FIGS. 6 through 11. A pair of meshed gears 48 are attached to each side of the feeder magazine. Each gear 48 further has a bell crank 49 attached thereto and extending radially outward from the center of each gear 48. Attached to the end of each bell crank 49 is a first link 90 that extends downwardly therefrom and attaches centrally to a second link 91. The second link 91 is rotatably attached on a pivot 92 near the outer edge of the feeder magazine 40. At other end of the second link 91 is the lifting bar 93. The lifting bar 93 extends from the one side of the feeder magazine 40 to the second side thereof as illustrated in FIG. 6A.

Located on the lower periphery of the feeder magazine 40, approximately coplanar with the lifting bars 93, is a set of four feeder index pins 94. Located coplanar and between the respective feeder index pins 94 and the lifting bar 93 are four supply index pins 95. The supply index pins 95 are spaced a distance apart to mate with the index notches 47 of a feeder tray 42.

Figure 11A:
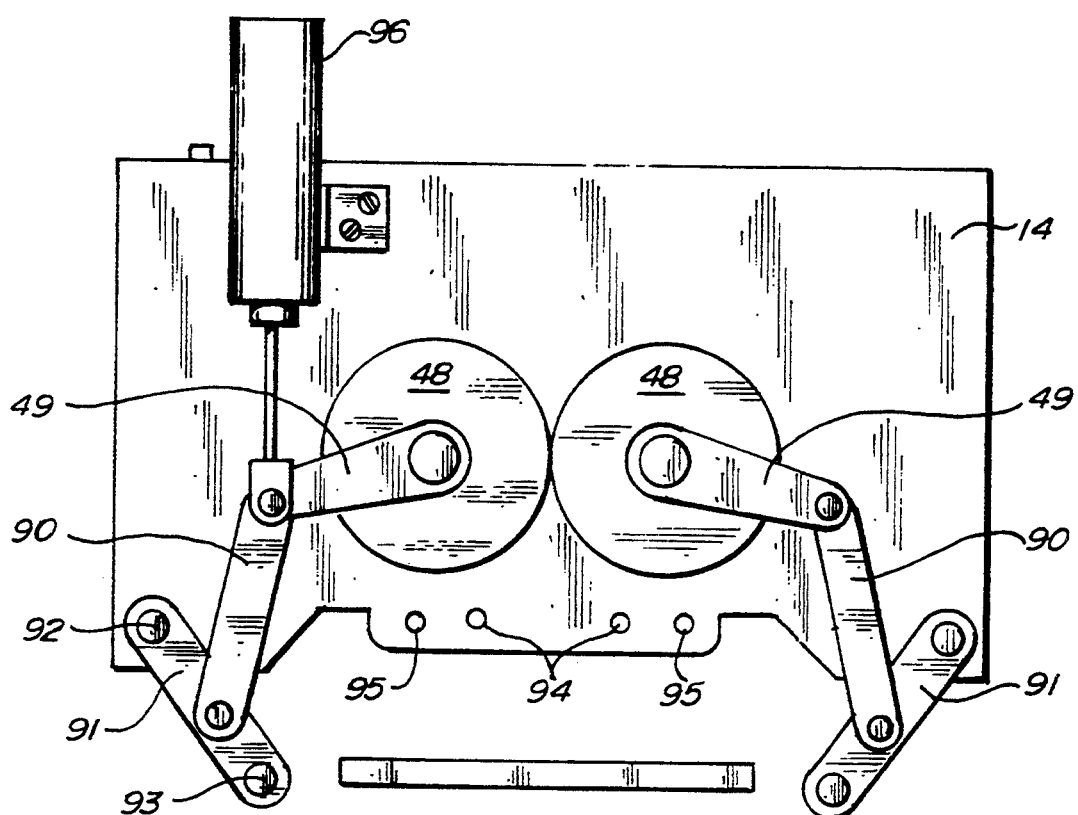

Actuating cylinder 97, as shown in FIG. 11A are connected for operating bell crank 49. The actuating cylinder 96 is powered by a conventional means such as compressed air or hydraulic pressure. Feed and supply index pin cylinders 97, 98 are used to actuate and control the respective feed and supply index pins 94, 95. When the bell crank 49 is moved upwardly, as shown by arrow "A" in FIG. 6, the supply index pins 94 are retracted and disengaged from feeder tray 42 allowing a respective feeder tray 42 to descend and be retained by the lifting bar 93. The bell crank 49 is then moved downwardly, as shown by arrow "B" in FIG. 7, thereby lowering a feeder tray 42 past the retracted supply index pins 95 to rest below the food feeder magazine 40 where the food items 16 are accessible to the robot 12. The supply tray 43 remains in the feeder magazine 40 being retained by the unretracted feeder index pins 94. The robot 12 may then, using a suitable end effector 19, as shown in FIG. 15, access the food items 16 for removal and placement on the cooking area 31.

Figure 9:
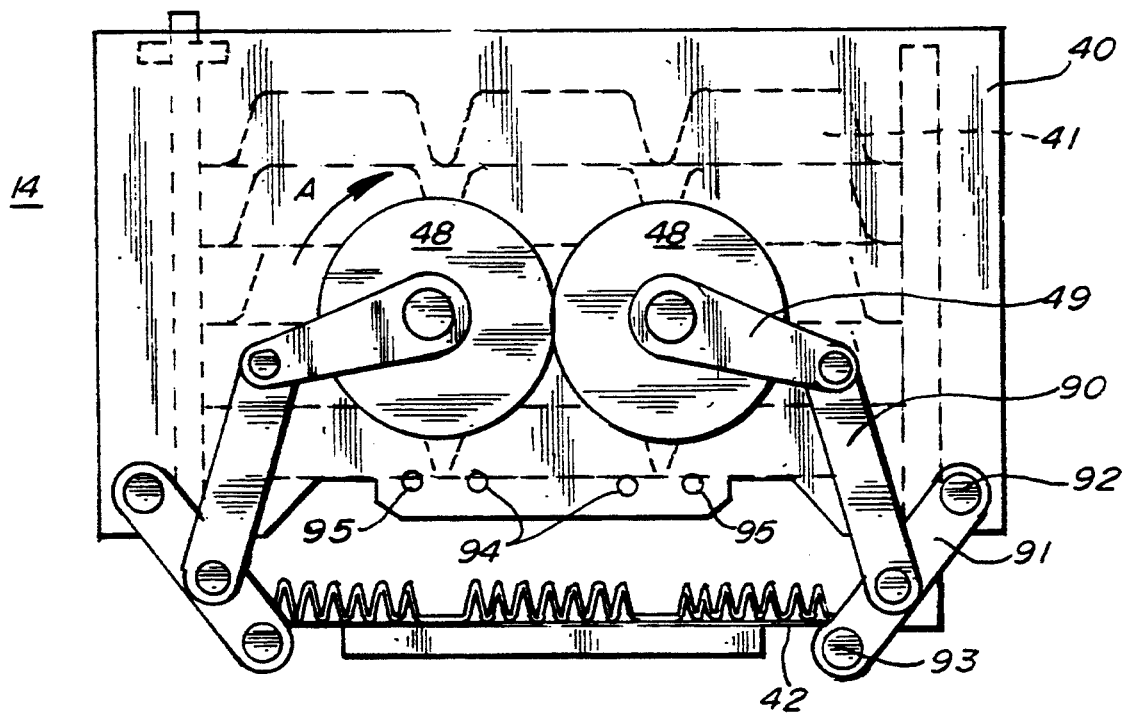
Figure 10:
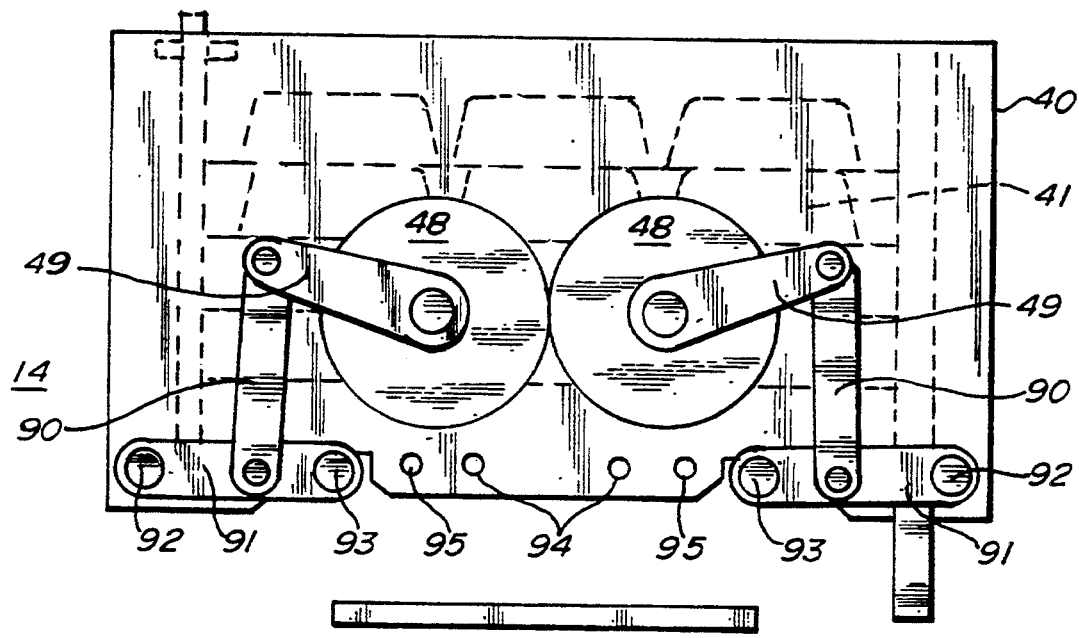
Figure 11:
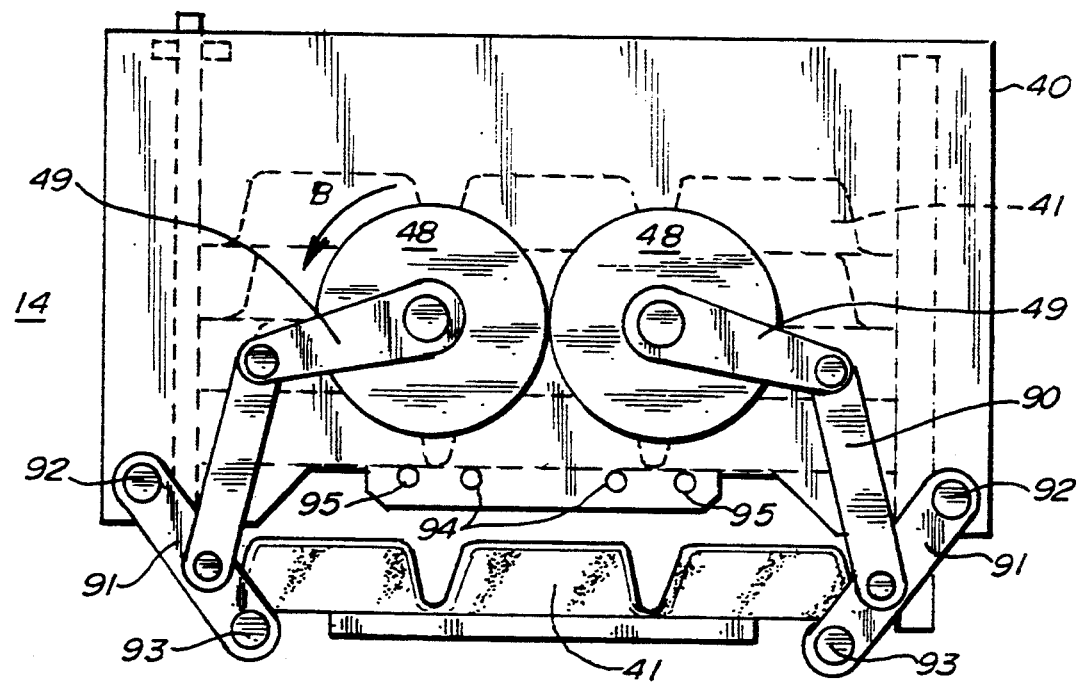

After the last food item 16 is removed from the lowered feeder tray 42, as shown in FIG. 9, the bell crank 49 is rotated upward, as shown by arrow "A" in FIG. 9, to the position as shown in FIG. 10. In this position, the feeder index pin 95 are retracted, allowing the supply tray 43 to descend. The bell crank 49 is again lowered, as shown by arrow "B" in FIG. 11 lowering the food carrier 41 on the lifting bars 93. After the food carrier 41 passes the indexing pins 94, 95 the indexing pins 94, 95 extend to retain the next food carrier 41 thereon. The food carrier is now accessible to the robot 12 and may be moved by the robot 12 out of the work area for reuse.

Figure 6:
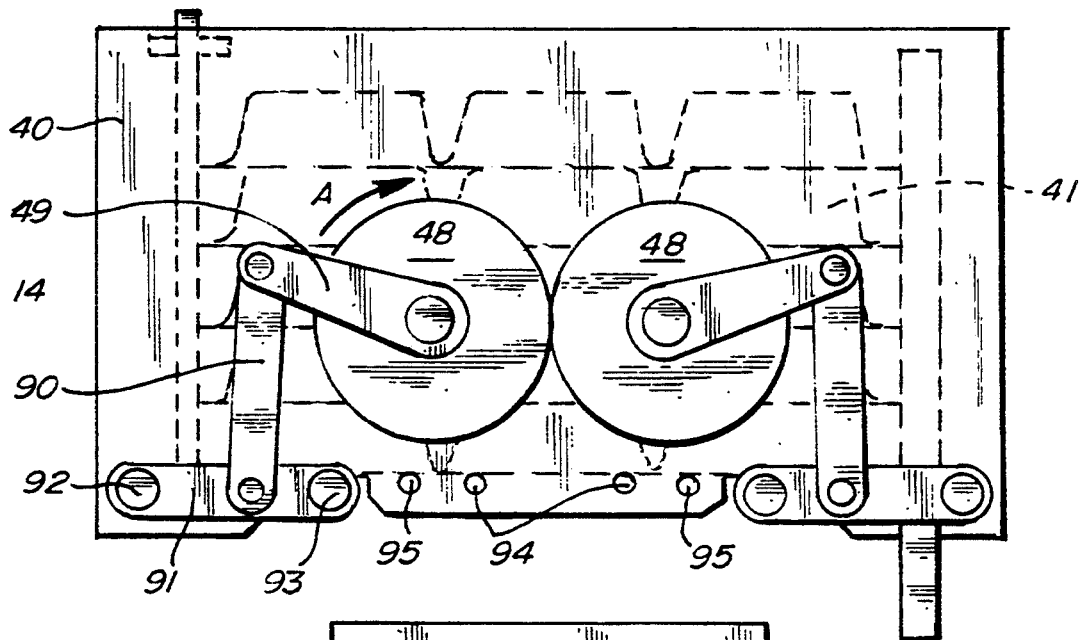
FIG. 6 through FIG. 11A illustrate the food feeding system dispenser in its various operational stages.
Figure 7:
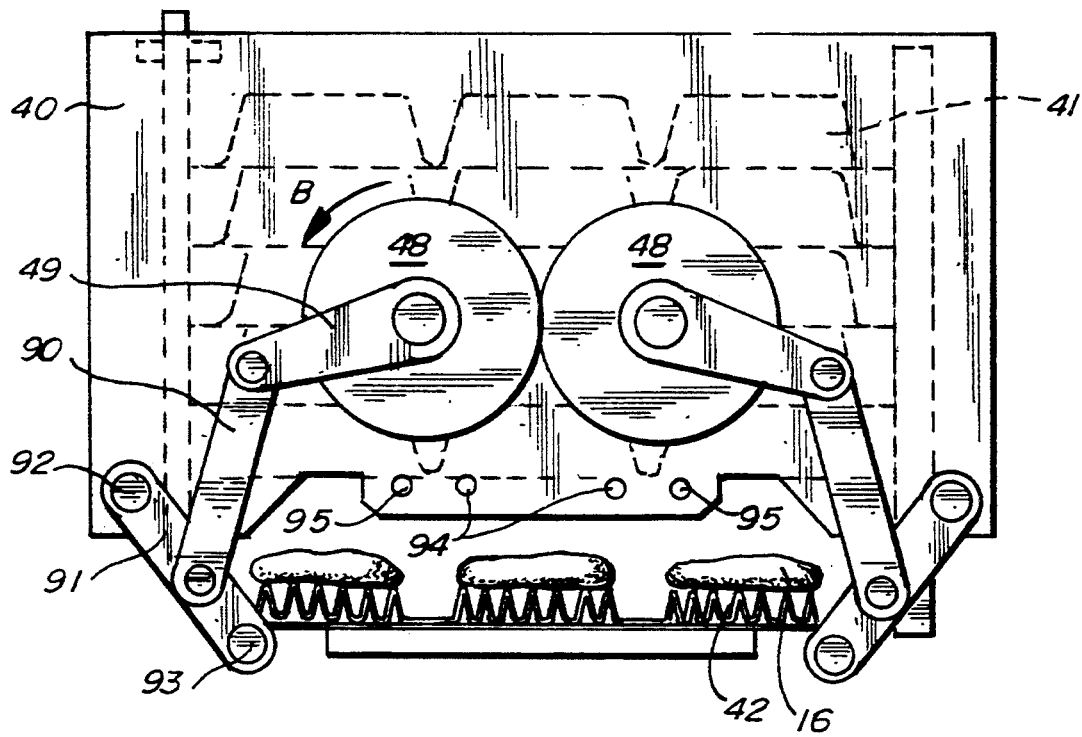
Figure 8:
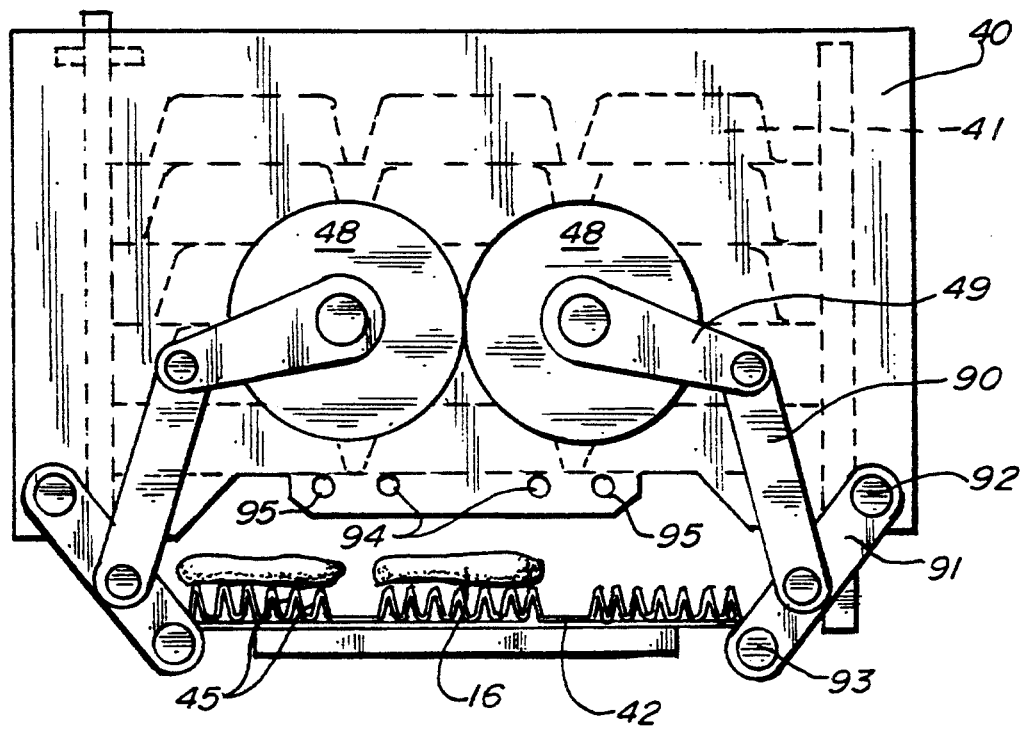

To access another food item 16, the bell crank 49 is moved upwardly as shown by arrow "A" in FIG. 6 beginning another cycle of the food feeding magazine 40.

As described in a first embodiment of the invention, the bell crank arms 49 are operated by the robot 12. The robot in response to the programmable controller 15 using an appropriate end effector 19 moves the bell crank 49 sequentially in the direction indicated by arrows "A" and "B" to operate the feeder magazine 40. The first embodiment is preferably used in an application where the robot 12 is displayed or viewable by the general public.

Figure 16:
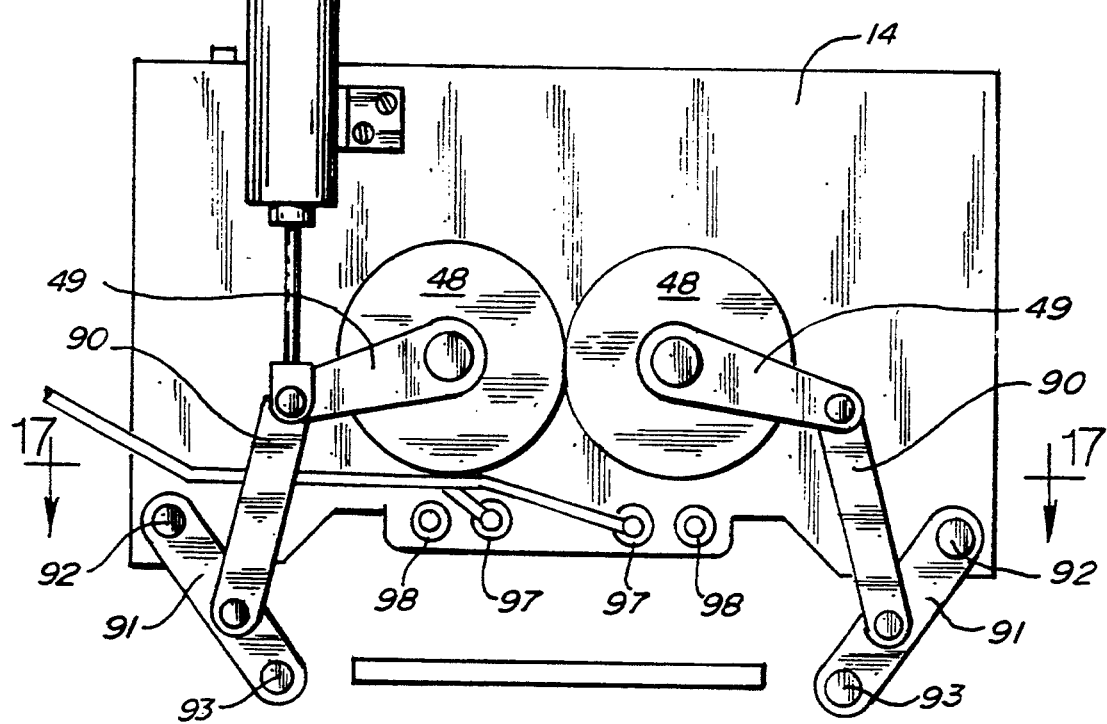
FIG. 16 illustrates the food feeding system dispenser in a first embodiment of the invention.
Figure 17:
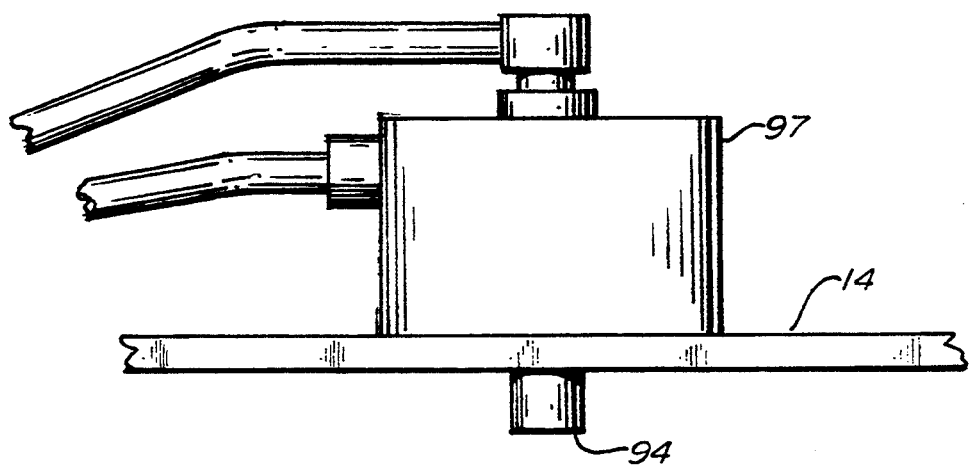
FIG. 17 is a partial cross sectional view of the food feeding system dispenser in a second embodiment of the invention taken along 17—17 of FIG. 16.

For convenience, the feeder magazine 40 operating means is shown as an actuating cylinder 96, in FIG. 11A. The actuating cylinder 96 is powered by a conventional means such as compressed air or hydraulic pressure. Index pins 94, 95 may be operated by an index pin actuating cylinder 97, 98 as shown in FIG. 16 and FIG. 17, or may be operated mechanically, as described in the description of the second embodiment of the invention. The index pin actuating cylinders 97, 98 are powered by any conventional means such as air, hydraulic, or electric, and is responsive to the programmable controller 15.

The programmable controller 15 controls and synchronizes all the operations being performed in the invention. The central unit controlling the bulk of the signal processing is the computer 50. The computer may be any type of a programmable computer and is exemplified by an IBM ® PC-type computer. An IBM ® PC type computer or a "clone" thereof is selected based on availability and cost considerations. Other computers would also perform the necessary functions, and in some applications would be preferred. In an application where one programmable controller 15 would be controlling a plurality of robots 12 a larger computing system may be necessary.

The computer 50 has a processing unit 56 which handles the majority of the signal processing, a keyboard 57 for operator input, and a monitor 58 for the operator to view the status of the computer 50 and any output from the processor unit 56 all of which are standard items generally considered necessary parts of a personal computer.

Operator input is preferably through the input keypad 52. However, operator input may be through the keyboard 57 or through a point of sale terminal type cash register (not shown). The advantage of using a keypad 52 is that the operator is presented with a limited number of keys to press thereby decreasing the probability of an input error and limiting operator access to system functions. Each key of the input keypad 52 represents either a particular food item 16 to be cooked, a lead number for multiply like items, or a modification to the cooking instructions for a food item, such as "rare" or "well done."

In a first embodiment of the invention, the food feeder interface 54 is used to control both the food feeder index cylinders 97, 98 which operate index pins 94, 95 and the actuating cylinder 96. Responsive to signals from the computer 50 processing unit 56 the food feeder interface 54 controls the actuation of actuating cylinder 96 on the food feeder magazine 40 that operates the bell crank 49 and the index pins 94, 95 in a synchronous manner as described above in the operation of the food feeder magazine 40. The robot controller 51 is an interface between the processing unit 56 and the robot 12. All commands to the robot 12 are processed through the robot controller 51 and passed to the robot 12 as is conventional practice. All responses from the robot 12 are likewise processed through the robot controller 51 for transmittal to the processing unit 56.

The position sensor 53 provides an input to the processing unit 56 allowing the processing unit to remain aware of the relative location of the rotating cooking area 31.

When in operation, the processing unit 56 coordinates and controls the various functions throughout the robotic grill system 10. The processing unit 56 receives input signals from the input keypad 52 and converts those input signals into an appropriate "language" understandable by the robot controller 51 and outputs this information to the robot controller 51. Robot controller 51 converts the commands received from the processing unit 56 to commands understood by robot 12 and monitors robot 12 performance of the commands. The processing unit 56 uses the input from the position sensor 53 to maintain the information about the position of the numerous food items 16 on cooking area 31, the status of each food items 16, so that at a previously selected time each food item 16 is turned, moved, or removed from the cooking area 31. The processor unit controls the operation of the food feeder system 14, in the first embodiment by actuating the food feeder interface 54.

To maintain the current information regarding the location of each of the multiple food items 16, the cooking area 31 is divided into a grid. The processing unit 56 of the personal computer 50 maintains grid map showing the current contents of each grid location at any given time. When the robot 12 places a food item 16 onto the cooking area 31, its grid location is determined and the grid map is updated by the processing unit. The processing unit 56 receives index signals from the position sensor 53 periodically. Upon receipt of a signal from the position sensor 53 the processing unit 56 updates the grid map to show the current location of each food item 16. The processing unit concurrently queries the grid map to determine whether an individual food item 16 needs to be serviced. When an individual food item needs to be serviced, the processing unit 56 executes a routine to transmit a signal to the robot controller 51 instructing the robot 12 to go to the food item 16 and perform the requested service. The robot controller 51 has sufficient intelligence to store which end effector 19 is presently in place on the robot arm 21 and instruct the robot 12 to change end effectors 19, when necessary. The robot controller 51 then commands the robot arm 21 to go to the location specified from the grid map and perform the necessary service.

In a second embodiment of the invention, a different food feeder system 14 is used. This second embodiment of the invention is preferred where the robot 12 is visible to the general public and the operation of the robot 12 cooking the multiplicity of food items 16 adds to the dining experience. In this embodiment, the robot 12 is programmed to actuate and operate the food feeder system 14. Actuating cylinder 96 is omitted and the bell crank 49 is moved in both the "A" and "B" directions sequentially by the robot arm 21 responsive to commands from the processing unit 56. The feeder index pin actuating cylinders 97 and the supply index pin actuating cylinders 98 may also be omitted where the operation of the feeder and supply index pins 94, 95 is through a mechanical linkage (not shown) to the bell cranks 49.

The operation of the invention 10 will be described following a single food item 16 through the cooking process for illustrative purposes. It is understood that in operation multiple food items 16 will be concurrently cooking.

In its use, an operator inputting orders enters an order by pressing the appropriate key on the input keypad 52. Operator input generates a signal which is transmitted to the processing unit 56. The processing unit 56 first decodes the input signal and then determines if there is an available food item 16 on a lowered food feeder tray 42, when a food item 16 is available, the processing unit 56 transmits a command to the robot control 51 to move the food item 16 to the cooking area 31. When no food item 16 is available, the processing unit 56 must first transmit the proper commands to cycle the food feeder system 14 to bring a full feeder tray 42 into its lowered access position.

Processing unit 56 determines which end effector 19 is needed, and which end effector 19 is currently attached to the robot arm 21. When necessary, robot 12 is commanded to retrieve and mount the needed end effector 19. Robot 12 then selects a food item 16 using its end effector 19. Robot 12 then moving its arm 21 places the food item 16 on the rotating cooking area 31 in the next available location while processing unit 56 updates its grid map showing the added food item 16.

The processing unit 56 coordinating the time necessary to cook the first side of the food item 16 with the input from the position sensor 53 waits for the food item 16 to cook. The cooking area 31 may be rotated during cooking.

During this waiting time, when the food item 16 has been ordered "rare" the processing unit 56 commands the robot 12 to move the food item 16 forward on the cooking area 31 to decrease the cooking time; or when the food item 16 has been ordered "well done" the processing unit 56 commands the robot 12 to move the food item 16 back on the cooking area 31 to increase the cooking time. When the proper cooking time has elapsed, the processing unit 56 transmits commands to the robot 12 telling the robot 12 where the particular food item 16 is telling the robot 12 instructing robot 12 to select the flipper end effector 23 for turning food item 16, and after determining the location of the food item 16 from the grid map, instructs robot 12 to go to the designated location and turn the selected food item 16.

The processing unit again waits, commanding the robot 12 to move forward the "rare" food item 16 or move back a "well done" food item 16, until the cooking has been completed.

At the completion of the cooking time, typically 300 degrees rotation of the cooking area 31, the processing unit 56 coordinates input from the position sensor 53 and the time elapsed, commands the robot 12 to remove the food item 16 for service. The food item 16 is then removed by the robot 12 using a proper end effector 22 and placed in a heated "holding" pan or tray to await operator removal of the food item 16 for service. Alternately, the operator may remove the food item 16 from an arcuate segment 32 of the cooking area 31 which is reserved for service. The "service" area of the cooking area 31 is synonymous with the "safe" area, an area from which the robot 12 is mechanically prevented from entering.

The food items 16 being cooked may be all like food items 16 or they may be different food items 16. During the cooking the processor unit 56 maintains information regarding the status and location of each food item 16 and coordinates and sequenced the tasks to be performed on each food item 16. The processing unit must also remain continuously available to accept input signal from the position sensor 53, the input keypad 52, and the robot controller 51.

In an alternate mode of operation, the operator will instruct the robotic chef 10 to cook a quantity of food items 16 and then hold these food items 16 at a warm temperature awaiting service. In this, the "cook and hold mode," the individual food items 16 are selected by operator input through the input keypad 52 or the personal computer keyboard 57. The computer 50 instructs the robot 12 through the robot controller 51 to place the appropriate food items 16 onto the cooking area 31. The cooking of the food items 16 proceeds as described above.

When the first arcuate section 32 which is now filled with cooked food items 16 has been rotated to the position where the food items 16 would be removed, the rotation of the cooking area 31 is stopped and the heat to the aforementioned first arcuate section 32 is reduced to a "warm" temperature level.

The food items 16 on the remaining arcuate sections 32 continue to cook without rotation of the cooking area 31. At appropriate times the robot 12 turns or moves these food items 16 responsive to the programmable controller 15.

As each remaining arcuate section 32 of food items 16 is cooked, the programmable controller 15 reduces the heat to that arcuate section 32 to a "warm" level. This sequence continues until all of the food items 16 are cooked, or the entire cooking area 31 is filled with cooked food items 16.

The present invention may be embodied in other specific forms without departing from the spirit or essential attributes thereof, and it is therefore desired that the present embodiment be considered in all respects as illustrative and not restrictive, reference being made to the appended claims rather than to the foregoing description to indicate the scope of the invention.

What is claimed:

1. An apparatus for automatically cooking a multiplicity of individual food items having an annular cooking area, a feeding system, a robot, and a programmable controller comprising
   a) the annular cooking area having multiple removable segments formed thereon; and a means for heating said cooking area to a settable temperature;
   b) the feeding system having a dispenser magazine with a plurality of food carriers and a means for accepting a plurality of food carriers, each of said food carriers containing a multiplicity of food items and a means for presenting the individual food carriers for access by the robot to access each individual food item:
   c) the robot having a plurality of individually selectable and attachable end effectors each of said end effectors adapted for selecting and obtaining the individual food items, manipulating the individual food items from the feeding system during cooking, or removing each of said multiplicity of individual food items from said cooking area;
   d) the programmable controller for settably controlling, coordinating and synchronizing the operation and heating of the rotating annular cooking area, the feeding system and the robot whereby the programmable controller receives the input from an operator selecting a food item for cooking and commands the robot to select and cook the food item while maintaining control over the robot so that the programmable controller instructs the robot to turn, manipulate, or remove the selected food item at selectable predetermined times.

2. The invention as described in claim 1, wherein the annular cooking area further comprises a means for rotating said annular cooking area about a central axis.

3. The invention as described in claim 2, wherein the means for rotating said cooking area comprises a motor controlled responsive to a signal from the programmable controller for continuously rotating said grill at a rate of between ten and forty minutes per revolution.

4. The invention as described in claim 2, wherein the means for rotating said cooking area comprises a motor controlled responsive to a signal from the programmable controller for incrementally rotating said grill at a rate of between five and forty-five degrees per increment.

5. The invention as described in claim 1, wherein the food feeding system is operable responsive to the programmable controller.

6. The invention as described in claim 1, wherein the robot has a movable arm and the food feeder system means for presenting the individual food carriers has a bell crank and the food feeder system means for presenting the individual food carriers is operated by movements of the bell crank by the robot arm.

7. The invention as described in claim 1, wherein the programmable controller is a personal computer.

8. An apparatus for automatically cooking a multiplicity of individual food items comprising
   a) a rotating annular cooking area having multiple removable segments formed thereon; a means for rotating said cooking area; and a means for heating said cooking area to a settable temperature;
   b) a feeding system having a dispenser magazine and a plurality of food carriers, each of said food carriers being rectangular in shape and having first and second edges located along the length thereof, each of said food carriers further being bifurcated into a feeder tray and a supply tray; the supply tray having a plurality of food receptacles formed therein for receiving the individual food items; each feeder tray having a plurality of transfer holders formed thereon, the transfer holders further located on each feeder tray so as to mate with the food receptacles on each supply tray, each feeder tray further having a pair of recesses formed upon both the first and second edge thereof, the dispenser being rectangular in shape having an open interior for receiving the plurality of food carriers; the dispenser further having a sequencing tray feeder, the tray feeder having an externally operable actuation means, a means for raising and lowering said food carriers responsive to the actuation means, and a means for sequentially retaining said trays responsive to each operation of said actuation means;
   c) a robot having at least one end effector, each end effector adapted for selecting and obtaining the individual food items from the feeding system, manipulating the individual food items during cooking on the cooking area, and removing each of said multiplicity of individual food items from said cooking area;
   d) a programmable controller for settably controlling, coordinating and synchronizing the operation of rotating annular cooking area, the feeding system and the robot.

9. The invention as described in claim 8, wherein the means for rotating said cooking area comprises a motor controlled responsive to a signal from the programmable controller for continuously rotating said grill at a rate of between ten and forty minutes per revolution.

10. The invention as described in claim 8, wherein the means for rotating said cooking area comprises a motor controlled responsive to a signal from the programmable controller for incrementally rotating said grill at a rate of between five and forty-five degrees per increment.

11. The invention as described in claim 8, wherein the food feeding system is operable responsive to the programmable controller.

12. The invention as described in claim 8, wherein the robot has a movable arm and the food feeder system means for presenting the individual food carriers has a bell crank and the food feeder system means for presenting the individual food carriers is operated by movements of the bell crank by the robot arm.

13. The invention as described in claim 8, wherein the programmable controller is a personal computer.

* * * * *